United States Patent
Job et al.

(10) Patent No.: US 9,856,092 B2
(45) Date of Patent: Jan. 2, 2018

(54) CONTINUOUS MOTION ARTICLE ARRANGING SYSTEMS AND METHODS

(71) Applicant: ILLINOIS TOOL WORKS INC., Glenview, IL (US)

(72) Inventors: Matthew A. Job, Greenville, SC (US); Craig Kirkpatrick, Simpsonville, SC (US); Christopher Ray, Greer, SC (US); Roger Johnston, Glenview, IL (US); Brett A. Stripe, Piedmont, SC (US)

(73) Assignee: Illinois Tool Woks Inc., Glenview, IL (US)

( * ) Notice: Subject to any disclaimer, the term of this patent is extended or adjusted under 35 U.S.C. 154(b) by 204 days.

(21) Appl. No.: 14/945,737

(22) Filed: Nov. 19, 2015

(65) Prior Publication Data

US 2016/0068353 A1  Mar. 10, 2016

Related U.S. Application Data

(63) Continuation of application No. 14/215,143, filed on Mar. 17, 2014.
(Continued)

(51) Int. Cl.

| | | |
|---|---|---|
| *B65G 47/29* | (2006.01) | |
| *B65G 47/244* | (2006.01) | |
| *B65G 47/26* | (2006.01) | |
| *B65G 47/28* | (2006.01) | |
| *B65G 43/08* | (2006.01) | |
| *B65G 47/08* | (2006.01) | |
| *B65G 47/90* | (2006.01) | |

(Continued)

(52) U.S. Cl.
CPC ............ *B65G 47/29* (2013.01); *B25J 9/0093* (2013.01); *B25J 15/0253* (2013.01); *B65G 43/08* (2013.01); *B65G 47/088* (2013.01); *B65G 47/244* (2013.01); *B65G 47/26* (2013.01); *B65G 47/28* (2013.01); *B65G 47/904* (2013.01); *B65B 21/00* (2013.01); *B65G 2201/0244* (2013.01)

(58) Field of Classification Search
CPC ...... B65G 47/244; B65G 47/29; B65G 47/26; B65G 47/28; B65G 43/08; B65G 2201/0244
USPC ......... 198/459.1, 460.1, 460.3, 461.1, 418.7, 198/419.1, 419.2, 419.3, 429
See application file for complete search history.

(56) References Cited

U.S. PATENT DOCUMENTS

| | | |
|---|---|---|
| 3,601,266 A | 8/1971 | Pearne et al. |
| 4,679,685 A | 7/1987 | Inoko |

(Continued)

FOREIGN PATENT DOCUMENTS

EP    1223121 A1    7/2002

OTHER PUBLICATIONS

Partial International Search, dated Jul. 31, 2014.

*Primary Examiner* — Leslie A Nicholson, III
(74) *Attorney, Agent, or Firm* — JK Intellectual Property Law, PA (57) ABSTRACT

A system, method and an end effector may arrange into a group two articles within a stream of articles moving spaced apart and in a line in a conveying direction on a conveyor. The system, method, and end effector may contact and slow the more downstream of the two articles and then contact the more upstream of the two articles without substantially slowing the more upstream article to form the group. The (Continued)

end effector may include a downstream stop portion for contacting at least one of the articles.

18 Claims, 12 Drawing Sheets

Related U.S. Application Data (60) Provisional application No. 61/787,779, filed on Mar. 15, 2013.

(51) Int. Cl.
*B25J 9/00* (2006.01)
*B25J 15/02* (2006.01)
*B65B 21/00* (2006.01)

(56) References Cited

U.S. PATENT DOCUMENTS

| | | | |
|---|---|---|---|
| 4,934,509 | A | 6/1990 | Gilgien |
| 5,553,442 | A | 9/1996 | Fadaie |
| 6,808,062 | B2 | 10/2004 | Cerutt et al. |
| 8,240,456 | B2 | 8/2012 | Duchemin et al. |
| 8,672,117 | B2 | 3/2014 | Stahl |
| 2008/0264763 | A1 | 10/2008 | Begin et al. |
| 2009/0249750 | A1 | 10/2009 | Black et al. |
| 2011/0017570 | A1 | 1/2011 | Graf |

CONTINUOUS MOTION ARTICLE ARRANGING SYSTEMS AND METHODS

RELATED APPLICATIONS

This application is a continuation of U.S. application Ser. No. 14/215,143, filed Mar. 17, 2014 and claims filing benefit of U.S. Provisional Patent Application Ser. No. 61/787,779 having a filing date of Mar. 15, 2013, both of which are incorporated herein by reference in their entirety.

TECHNICAL FIELD

The present disclosure relates generally to arranging articles provided on a conveyor using a continuous motion device.

BACKGROUND

Articles such as beverages or other consumer product containers are often wrapped in packages holding a number of the articles before they are placed on a pallet or divided into laned flows. Therefore, groupings of 6, 12 or 24 bottles for example may be created and held together via stretch or shrink wrapped plastic, boxes, and/or blanks. These groupings are then oriented in some fashion to create a pallet load or laned flow.

Typically, the groupings are fed out of a wrapping or other packaging source individually in a uniform fashion (all aligned the same way) and at a uniform rate (all at the same speed and with the same spacing between them). Various devices have been proposed to take the groupings in such a uniform stream and to place them as desired laterally within the stream (for example by moving a grouping left or right from a feed location) and to orient them within the stream (for example by turning a grouping 90 degrees) such that they form a desired pallet layer downstream or such that they are placed into lanes for further processing downstream. Such concepts can also apply to individual articles, such as boxes, that are to be palletized. Thus, as noted herein an article may be a single item (such as a box or other item) or may include a grouping or articles such as a twelve-pack grouping of containers.

Such placement and orientation can be provided by robot arms, by gantry devices, by orienting conveyors, by pushers or other equipment, or even by hand. When robot arms or gantry devices are used, the end effectors may have an optional grasping function, wherein an article can be grasped between two opposing plates and the article can then be moved to a desired location and/or oriented in a desired way. One or both of the plates can move so that the article is squeezed just tightly enough to move and place the article, and each such article is moved and placed individually.

Figures 12, 13A:
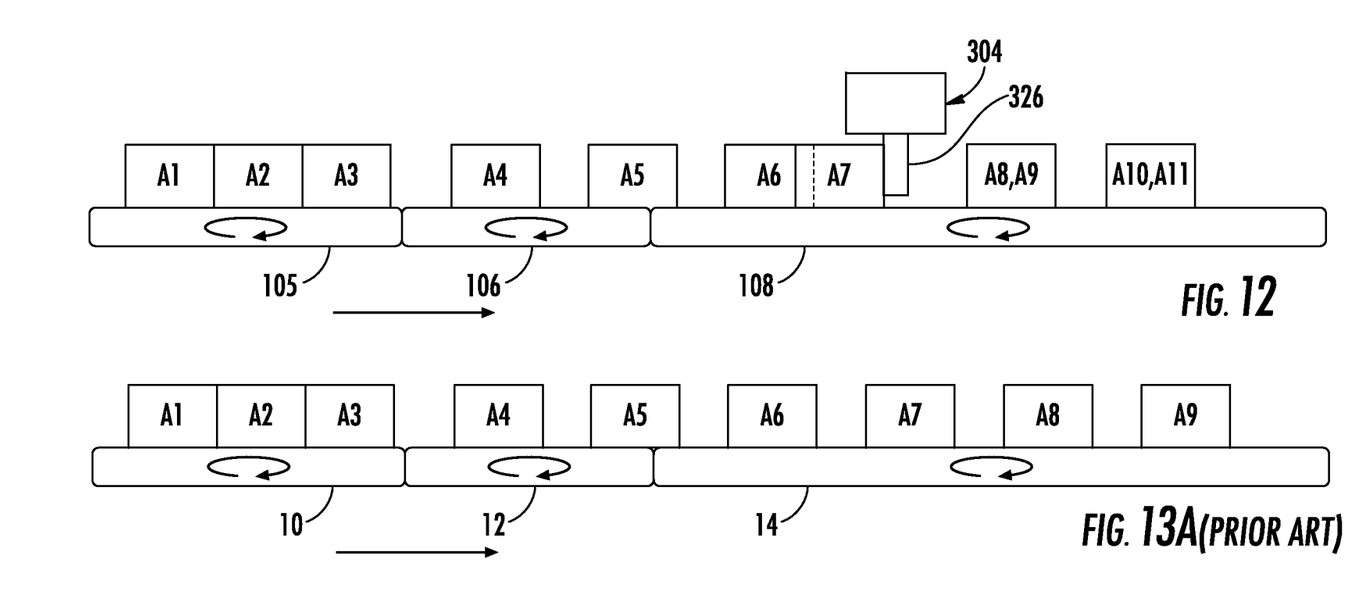
FIG. 12 is a schematic representation of another possible flow along conveyors while groups of articles are arranged according to the disclosure.
FIGS. 13A and 13B are schematic representations of flow along conveyors according to conventional methods.

In one common system, as shown in FIG. 13A, flow enters from the left as shown on a first conveyor 10, is transferred to a higher speed gapping conveyor 12 to spread out articles in the direction of travel, and is transferred to a further conveyor 14 where orientation occurs in some fashion. Note that articles A1, A2 and A3 may or may not be substantially spread apart, while articles A4-A9 are uniformly spread apart. Such arrangement would typically occur where a constant speed gapping conveyor 12 and further conveyor 14 are running faster than constant speed first conveyor 10. In such a conventional system, individual articles are placed and oriented one at a time, as noted above.

Figure 13B:
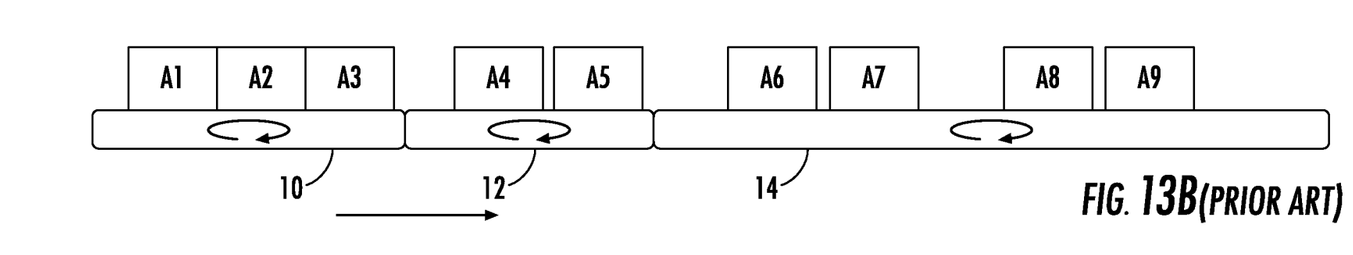

In another conventional system of FIG. 13B, gapping conveyor 12 is a "surge" conveyor driven at a non-constant speed in order to group two articles more closely together for handling at once to save placement steps in forming a pallet layer or in laning. However, use of a non-constant speed conveyor 12 can introduce stability issues for articles, and the ultimate placement of articles on conveyor 14 may be inconsistent due to acceleration and frictional issues.

Accordingly, improved methods and systems would be welcome for arranging articles on a conveyor for forming a pallet layer or laning, addressing drawbacks of conventional systems or other issues.

SUMMARY

Aspects and advantages of the invention will be set forth in part in the following description, or may be obvious from the description, or may be learned through practice of the invention.

According to certain aspects of the present disclosure, a system is disclosed for arranging articles within a stream of articles moving spaced apart and in a line in a conveying direction on a conveyor. The system may include an object manipulation device movable and configured to form a group of two of the articles in the line together by contacting and slowing the more downstream of the two articles and then contacting the more upstream of the two articles without substantially slowing the more upstream article. Various options and modifications are possible.

According to certain other aspects of the disclosure, an end effector is disclosed for an object manipulation device for arranging together into a group two articles within a stream of articles moving spaced apart and in a line in a conveying direction on a conveyor. The end effector may include a head portion for attachment to the object manipulation device; two lateral side portions attached to the head portion and spaced for receiving the two articles; and a downstream stop portion for contacting a downstream side of at least one of the two articles. Again, various options and modifications are possible.

According to certain other aspects of the disclosure, a method is disclosed of using an object manipulation device to arrange two articles within a stream of articles moving spaced apart and in a line in a conveying direction on a conveyor. The method may include contacting the more downstream of the two articles; slowing the more downstream of the two articles; and maintaining contact with the more downstream of the two articles while contacting the more upstream of the two articles without substantially slowing the more upstream article to form a group of the two articles. Again, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 through 12 show examples of systems, end effectors and methods for arranging articles within a stream of articles moving along a conveyor into groups of at least two articles. The group of articles can be arranged as desired on a conveyor by an object manipulation device such as a robot arm or gantry device for inclusion within a pallet layer or for laning. The grouping can occur in a constant speed environment. All articles need not be grouped, and need not be grouped in pairs. However, grouping allows for fewer object manipulation device movements to orient a pallet layer or control laning. Accordingly, by reducing the number of object manipulation device movements, the pallet layer or laning can be arranged more quickly. For example, the included conveyors may be able to be run at a substantially higher linear speed than conventional conveyors because substantially fewer object manipulation device movements are needed.

As shown, a system 100 may include one or more object manipulation devices such as the illustrated robot arm assemblies 102 or such as gantry devices. Each object manipulation device has an end effector assembly 104 for arranging articles received from a feed conveyor 106 while being transmitted on a pallet layer forming or laning conveyor 108. Feed conveyor 106 may be a gapping conveyor or may be downstream from a gapping conveyor. Alternatively, no gapping conveyor could be present, and other methods of spacing articles could be used, such as a pin conveyor, a diverter, gating, etc.

As shown articles 110 include multiple containers 112. Such containers 112 could be held together in any conventional fashion or could be held within a box or carton. Therefore, it should be understood that articles 100 could be any palletable or lanable items and could instead be individual items such as boxes.

Articles 110 are fed along feed conveyor 106 to reach a position near object manipulation device 102. The illustrated device, robot arm assembly 102, may be mounted on support structure 114 that may be adjacent to either feed 106 or pallet layer forming or laning conveyor 108, or it may extend atop either, depending on the application as discussed below.

As shown, end effector assembly 104 includes a head portion 116 attached to an end 118 of the object manipulation device 102. Head portion 116 and end 118 may be, if desired, readily disassembled to switch to a different end effector (see end effector 204 in FIG. 6 and end effector 304 in FIG. 9) if different articles or groupings are to be used.

End effector 104 also includes two lateral side portions 120. One or both side portions 120 may be, but need not be, movably attached to head portion 116. As shown, side portions 120 are plates that can both be driven back and forth via a mechanism, which may be for example gears 122 and a chain 124 driven by a motor 128. However, other mechanisms could be used such as gears, belts, hydraulics, pneumatics, etc., to move one or both side portions. Side portions 120 if movable relative to head portion 116, can grip two articles 110a and 110b once they are placed together.

A downstream stop portion 126 is attached to head portion 116. Stop portion 126 contacts a downstream side of the more downstream article 110b on conveyor 108. Stop portion 126 need not be driven relative to head portion 116, but could be if desired. Object manipulation device 102 moves along conveyor 108 so that the more downstream article 110b is contacted and at least slowed until the more upstream of the two articles 110a contacts the end effector via contacting the more downstream article 110b. Preferably object manipulation device 102 is moved along conveyor 108 such that the contact between articles 110a and 110b occurs without substantially slowing the more upstream article 110a.

End effector 104 may be moved laterally (arrow a), along conveying direction (arrow b), or rotated (arrow c) as desired to place the articles so that a pallet layer or desired laning may be formed downstream in a desired pattern. Thus, continuous motion along conveyor 108 at or about the speed of the conveyor is substantially maintained, and the throughput can beneficially be higher than if full stoppage were achieved or a non-constant speed gapping conveyor were used.

Figure 1:
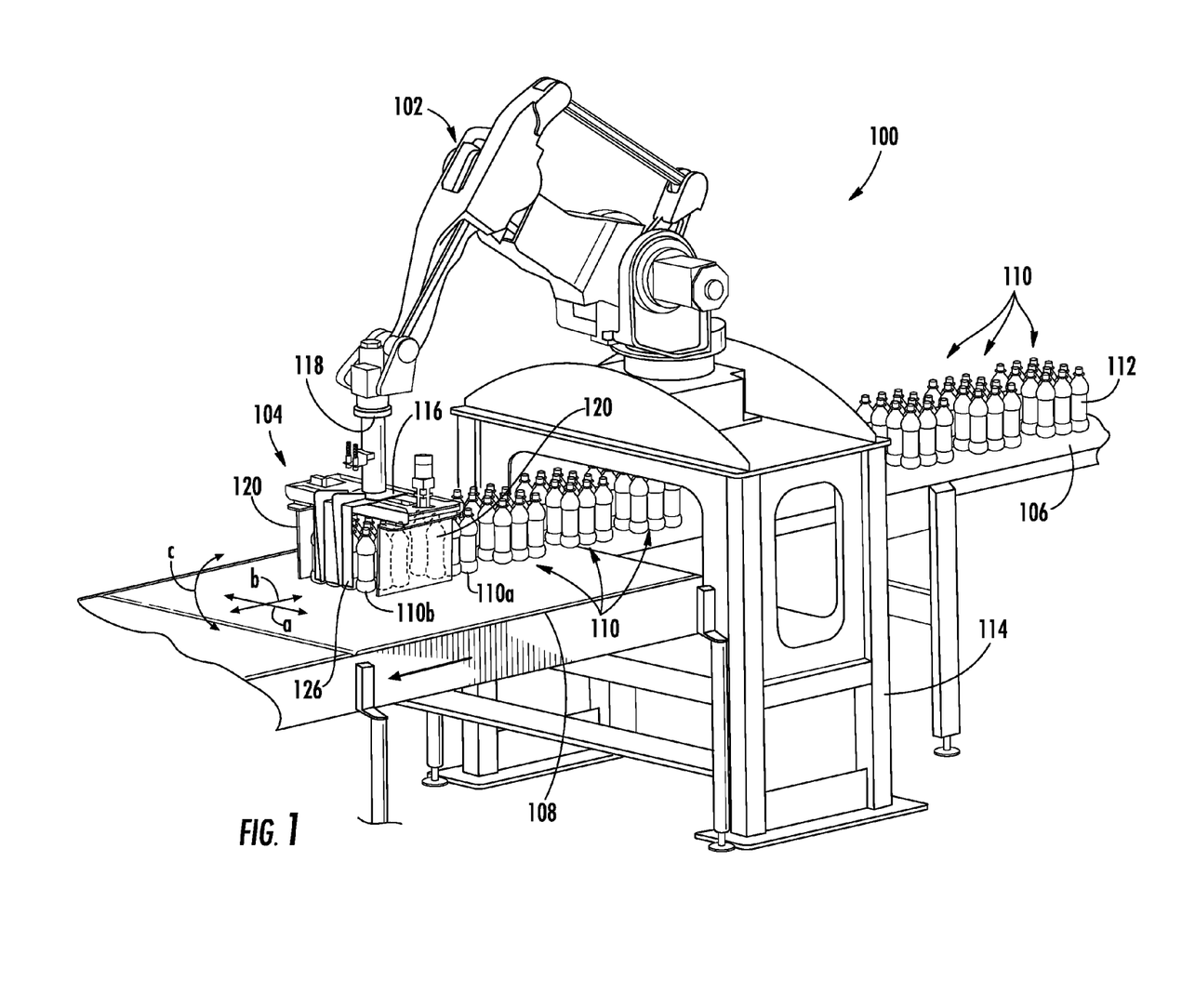
FIG. 1 is a perspective view of a system for arranging streams of articles according to certain aspects of the present disclosure and having an object manipulation device with a first end effector.
Figure 2:
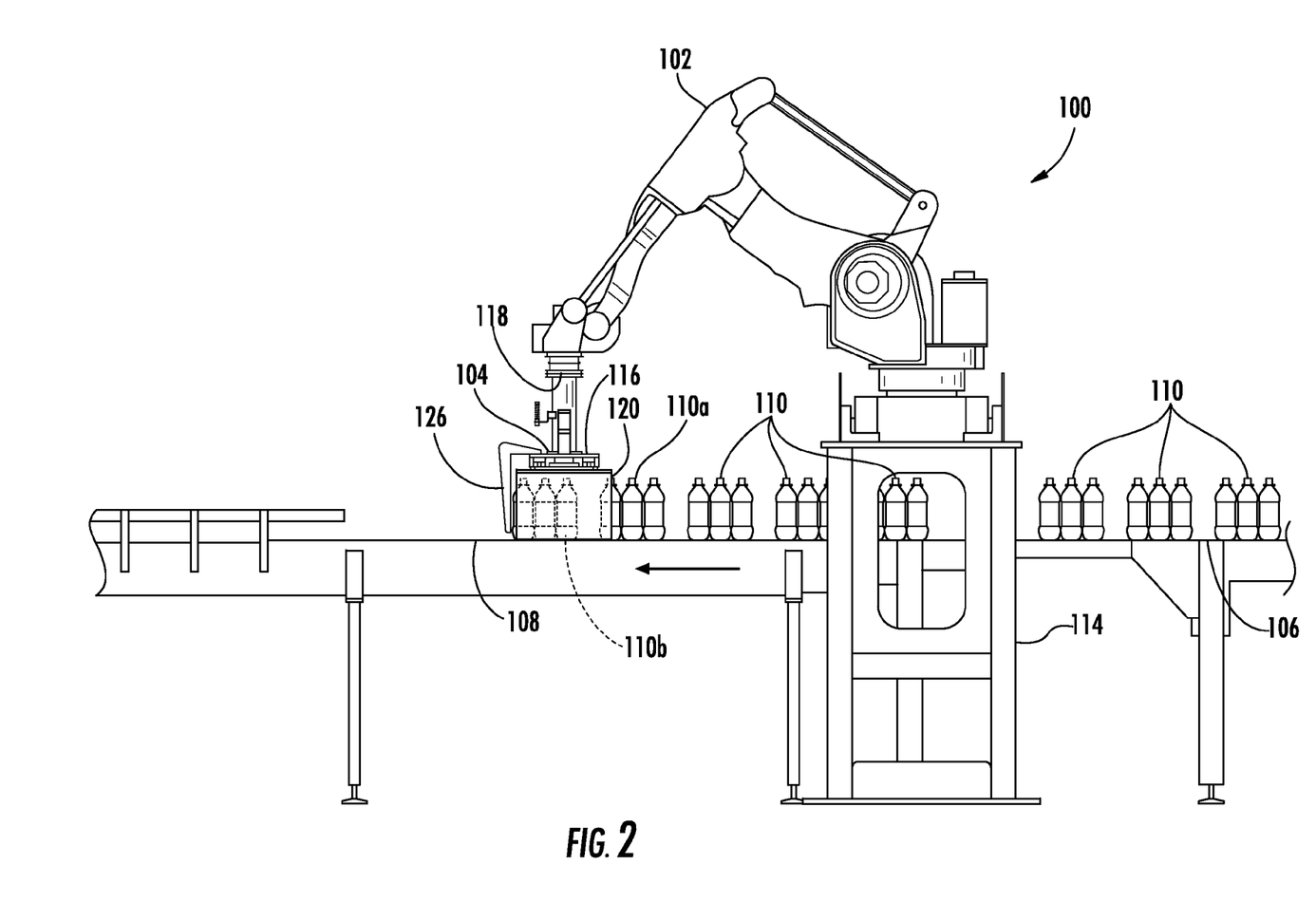
FIG. 2 is a side view of the system of FIG. 1.
Figure 3:
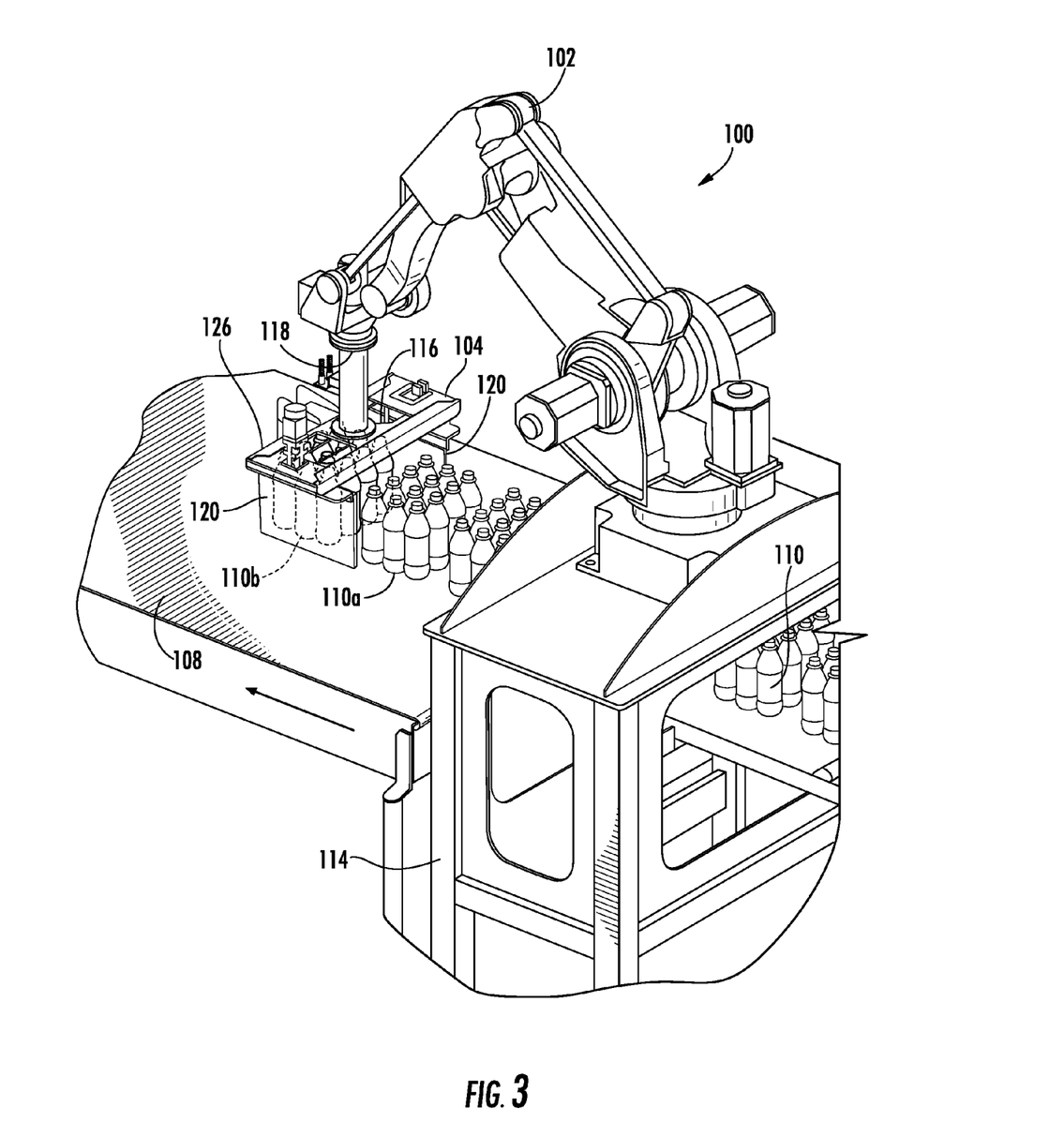
FIG. 3 is a close-up perspective view of a portion of the system of FIG. 1.
Figure 4:
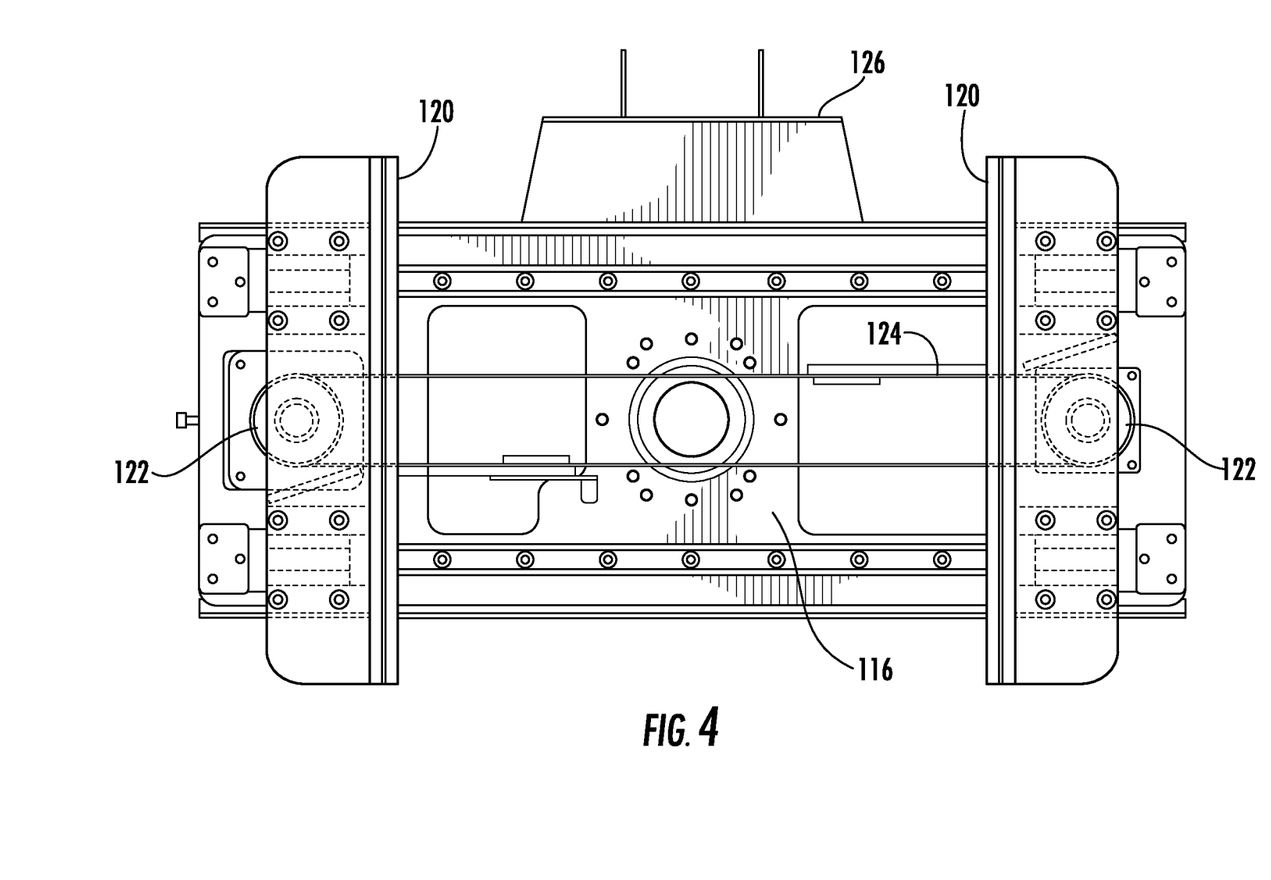
FIG. 4 is a bottom view of one end effector usable with the system of FIG. 1.
Figure 5:
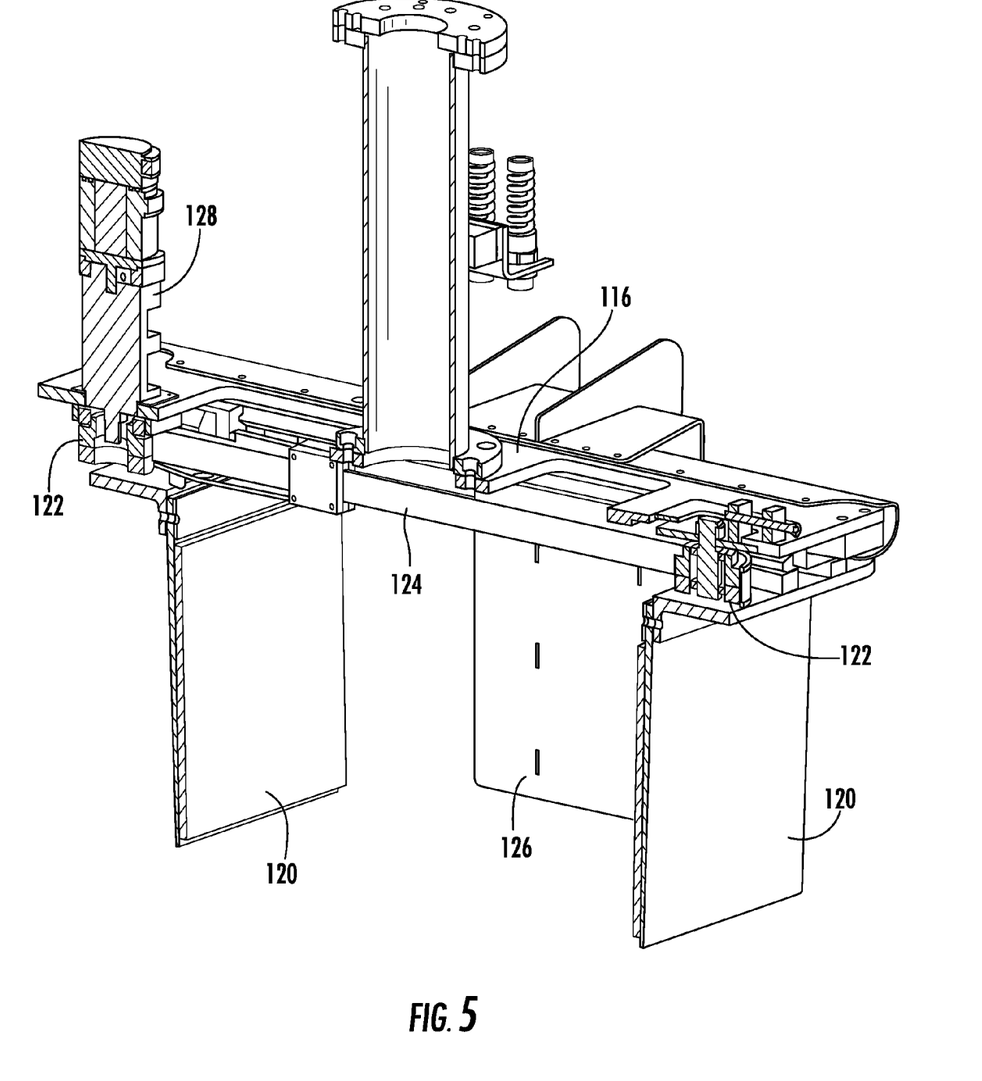
FIG. 5 is a cross-sectional view of the end effector of FIG. 4.
Figure 6:
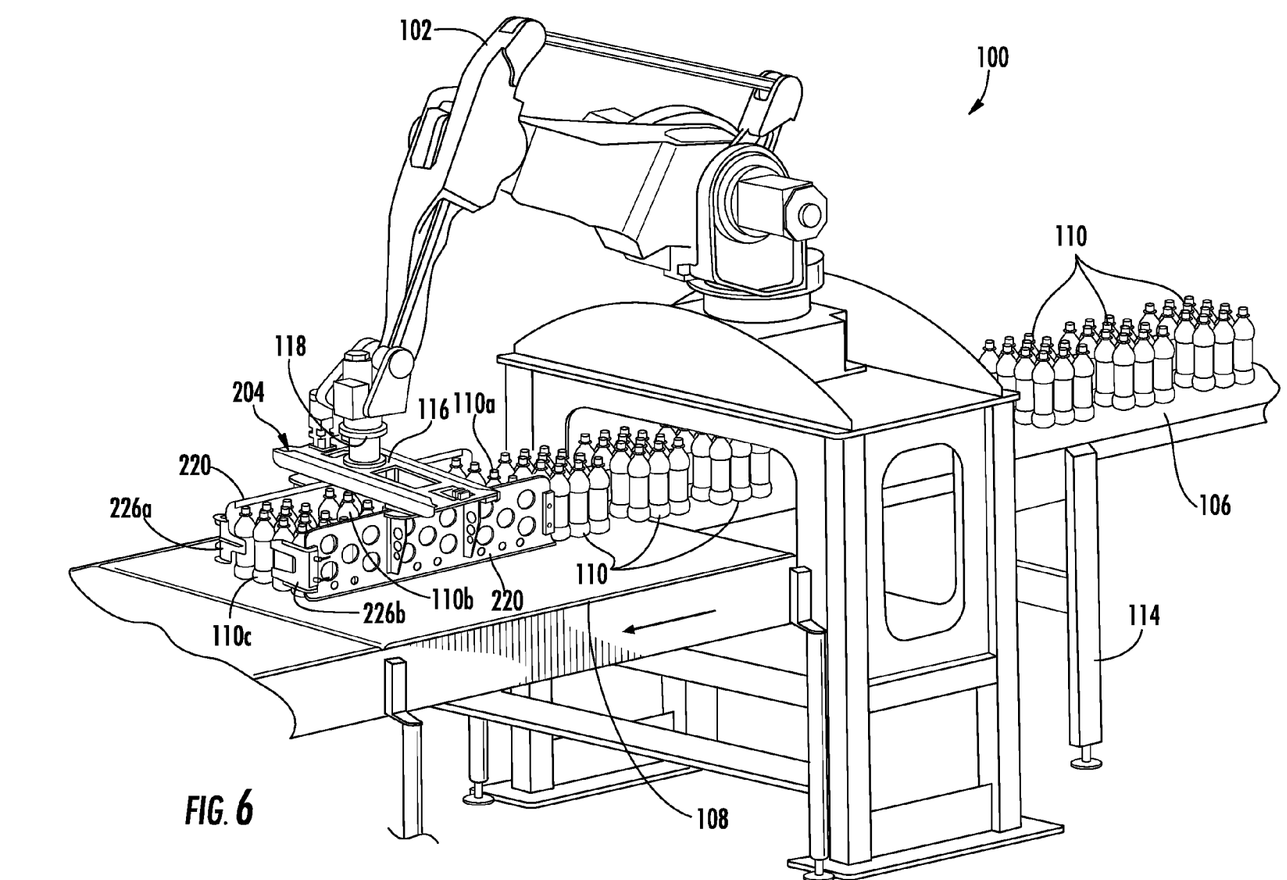
FIG. 6 is a perspective view of the system as in FIG. 1, having a second end effector.
Figure 7A:
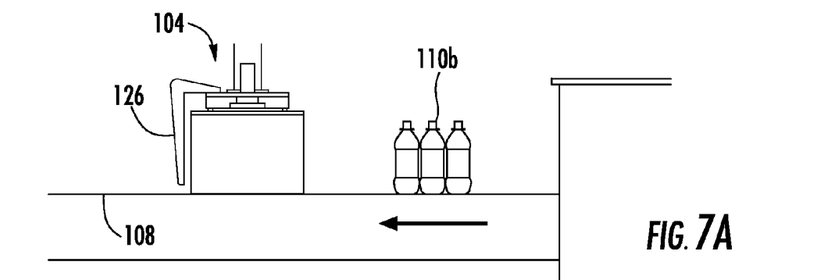
FIGS. 7A-7D are schematic representations of the possible steps used in arranging two groups of articles according to the disclosure.
Figure 7B:
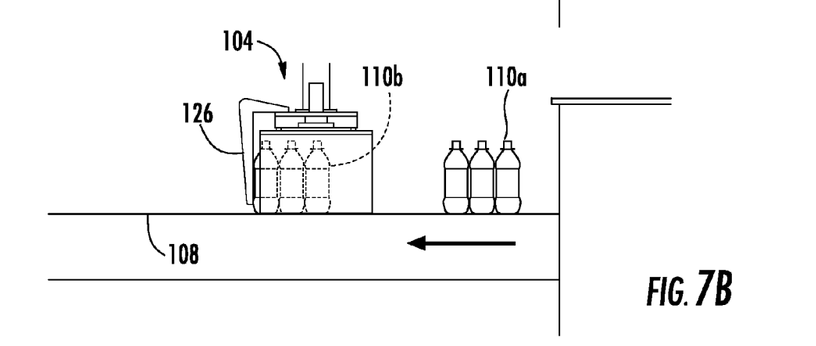
Figure 7C:
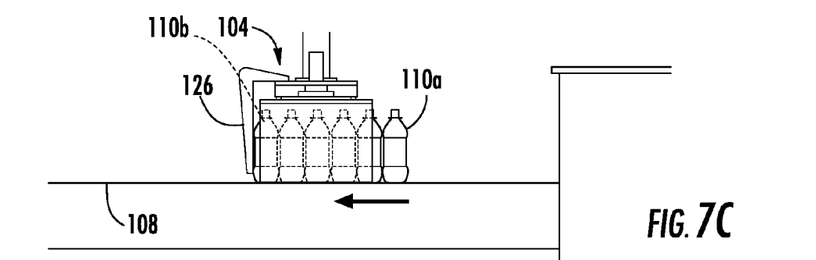
Figure 7D:
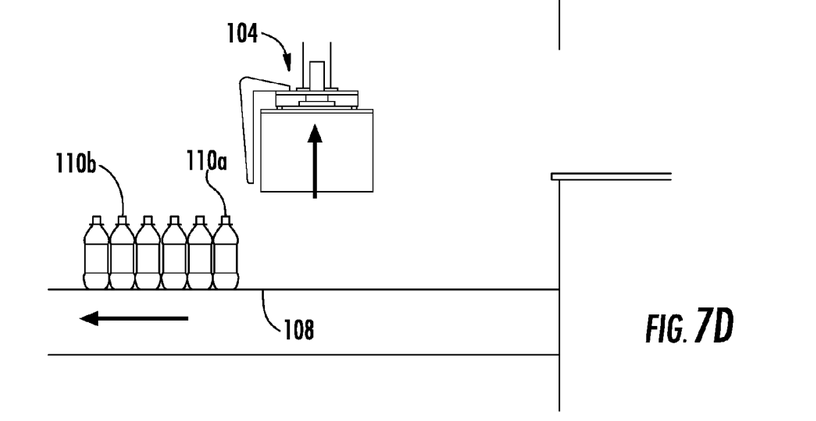

FIG. 6 shows system 100 with an alternate end effector 204. As shown, three articles 110a, 110b, and 110c are being grouped between side portions 220. Two stop portions 226a and 226b are provided, each attached to one of side portions 220 instead of head portion 216, although only one stop portion could be provided attached to only one side portion or head portion.

The operation of system 100 using end effector 204 is substantially similar as using end effector 104. Alternatively, end effector 204 could be used to group only two larger articles 100 (for example 24 containers) instead of three articles of 12 containers as shown.

FIGS. 7A-7D show one example of grouping of two articles 110a and 110b using end effector 104. As shown, stop portion 126 briefly slows article 110b until article 110a contacts end effector 104 via contacting article 110b. End effector 104 then moves up and out of the way without gripping by side portions 120, although if desired the articles could be moved, gripped and/or arranged differently by sliding or rotating (either with or without gripping).

Figure 8:
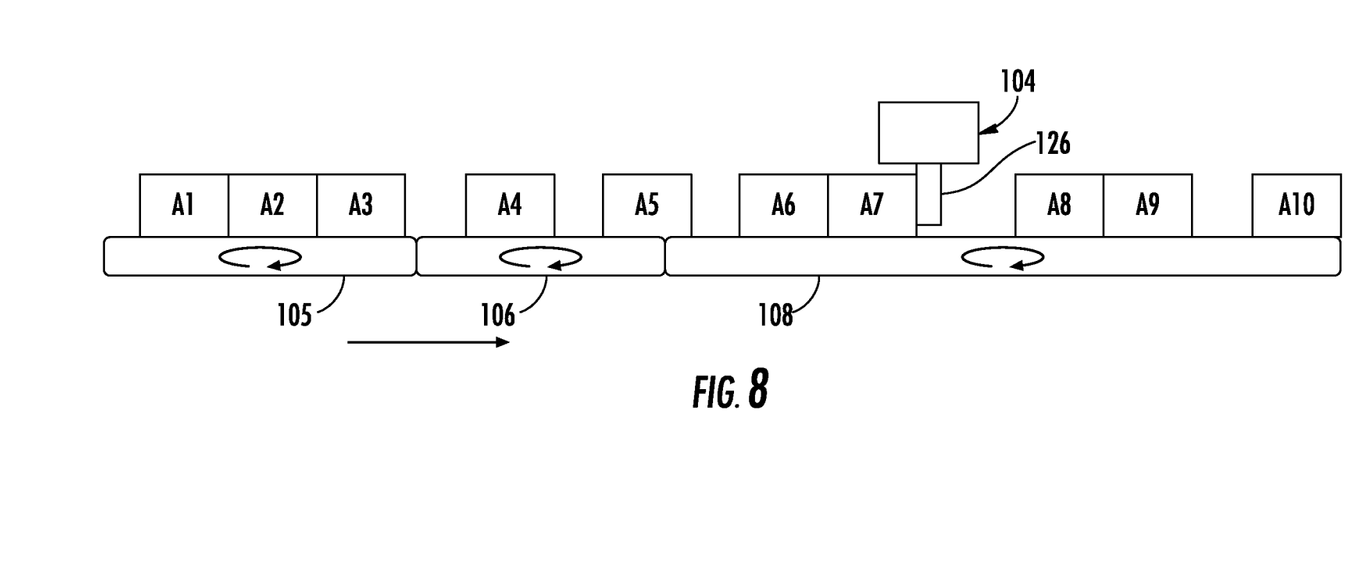
FIG. 8 is a schematic representation of one possible flow along conveyors while groups of articles are arranged according to the disclosure.

FIG. 8 shows a conveyor 106 which may be a constant feed gapping conveyor downstream of another conveyor 105, which may be for example, the outlet of a shrink tunnel, another packaging conveyor, or any supply conveyor. Conveyor 108 is driven at a speed similar to or the same as conveyor 106 while end effector 104 contacts and groups articles A6 and A7 via contact with stop portion 126, as shown. Articles A8 and A9 are grouped, and may have been arranged by end effector 104 as well.

Figure 9:
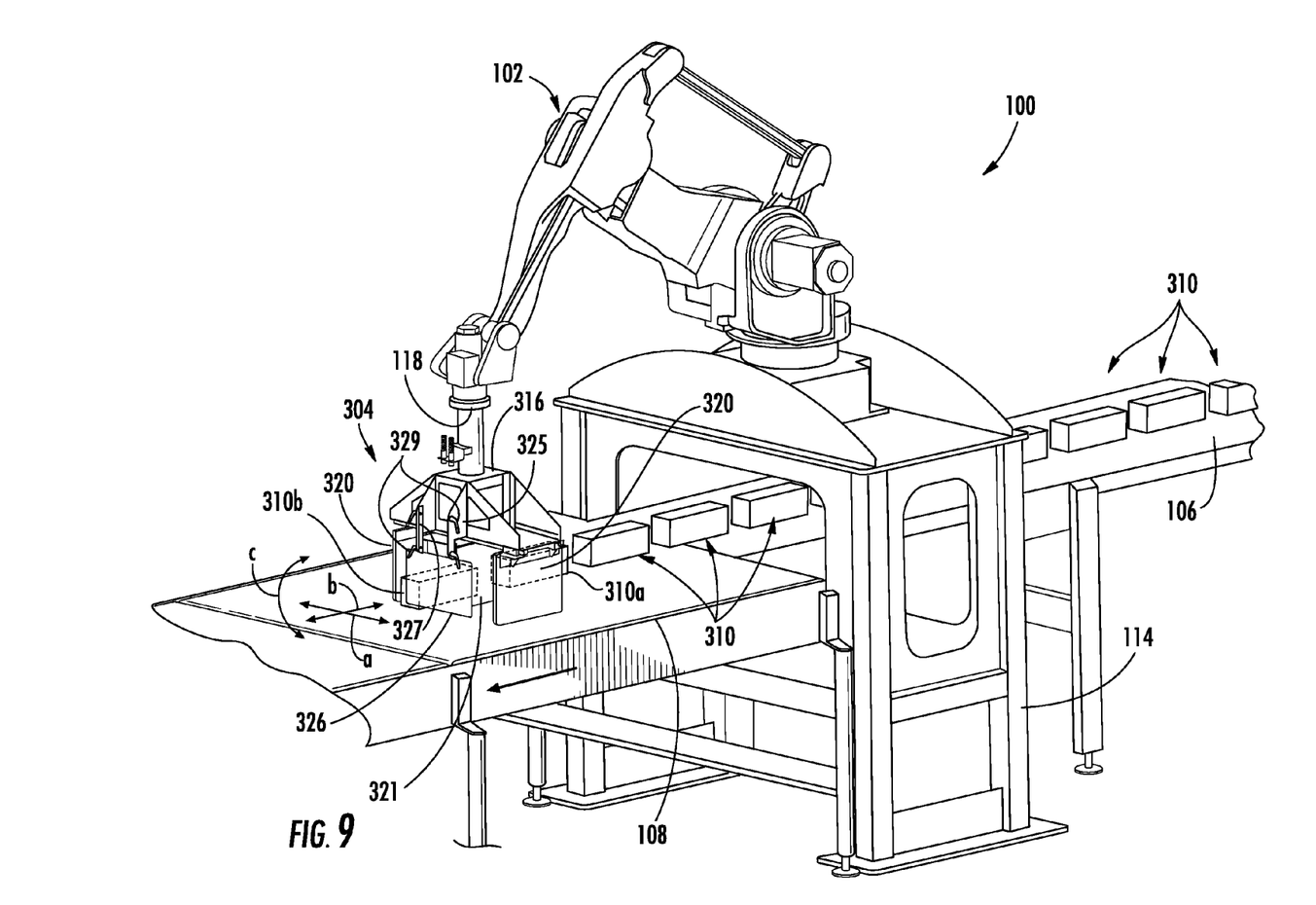
FIG. 9 is a perspective view of the system as in FIG. 1, having a third end effector.

FIG. 9 shows system 100 with an alternate end effector 304. As shown, end effector includes a head portion 316, two lateral side portions 320, and a divider 321. Divider 321 may be a plate as shown. Divider 321 could alternatively be other structures such as rods, multiple smaller plates, etc. End effector 304 is particularly suited to but not limited to use with articles that are substantially longer than they are wide, such as a 6×2 can carton.

Figure 10:
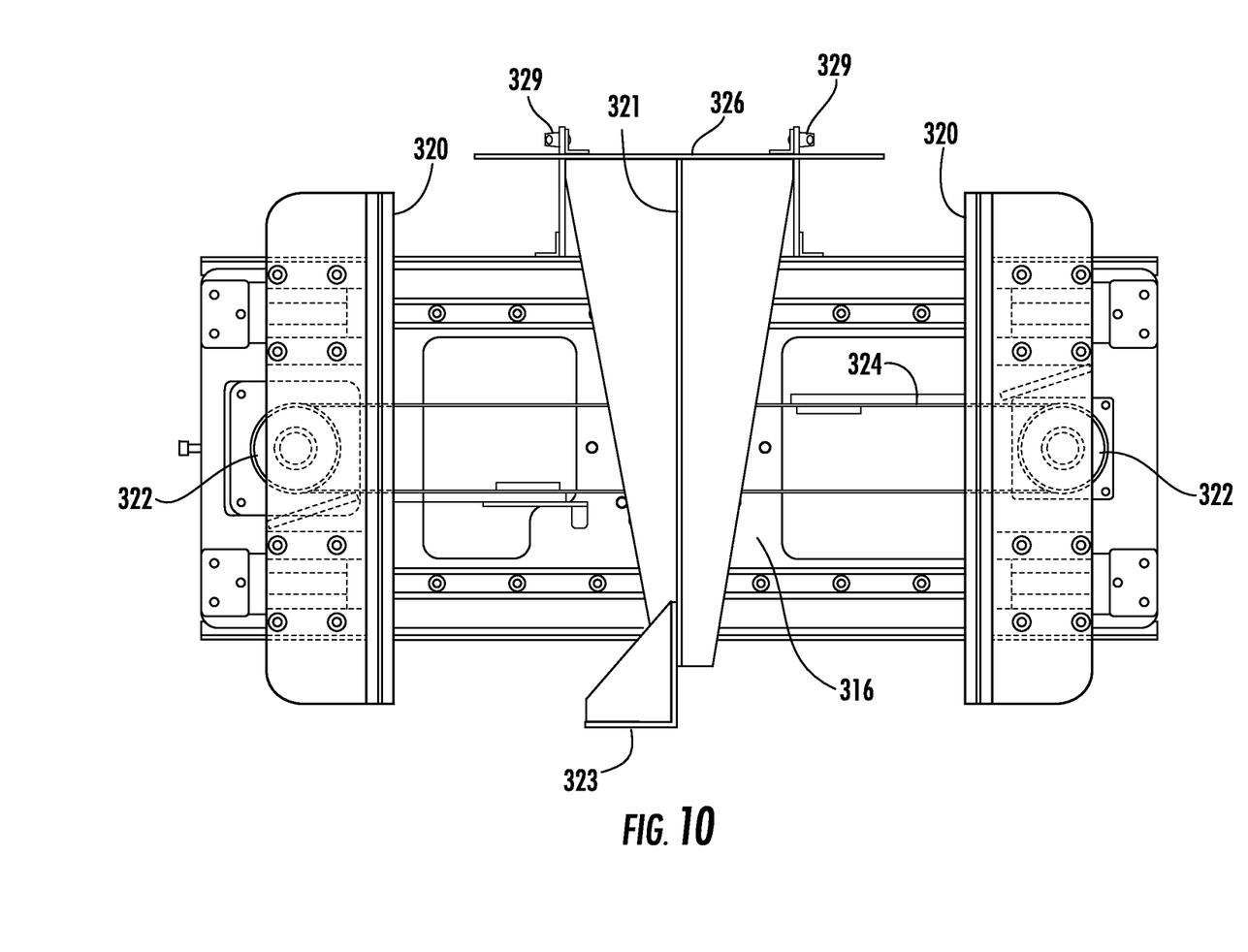
FIG. 10 is a bottom view of the end effector of FIG. 9.

FIG. 10 shows end effector 304 from below. As shown divider 321 may be located between lateral side portions 320 and upstream of and perpendicular to stop portion 326. If desired divider 321 may include a holding plate 323 on the end opposite stop portion extending toward one or both lateral side portions to assist in holding articles with end effector 304 during positioning on conveyor 108. Divider 321 also assists in holding and aligning articles 310a and 310b, but may not be needed to grip and align two articles in all facets of the invention.

If desired, end effector 304 may simply be a modified "modular" version of end effector 104. If so, a change out of stop portion 126 for stop portion 326/plate 321/plate 323 can be used to convert end effector 104 to end effector 304. Cooperative attachment hardware could be provided on heads 116/316 and stop portions 126/326 for a rapid changeover in case different articles are to be run in system 100. FIG. 9 shows plates 325 on head 316 removably attached to mounting plates 327 of plate 326 via four twist-lock handles 329. Similar structure (not shown) could be used on heads 116 and 216, if desired. Also, alternate cooperative attachment hardware such as screws, spring loaded pins, cotter pins, clips, etc. could be employed. Alternatively, the system could employ three separate end effectors 104, 204, 304, each attachable to end 118 of robot arm assembly 102 in a modular fashion to allow system 100 to handle different types of articles.

Figure 11A:
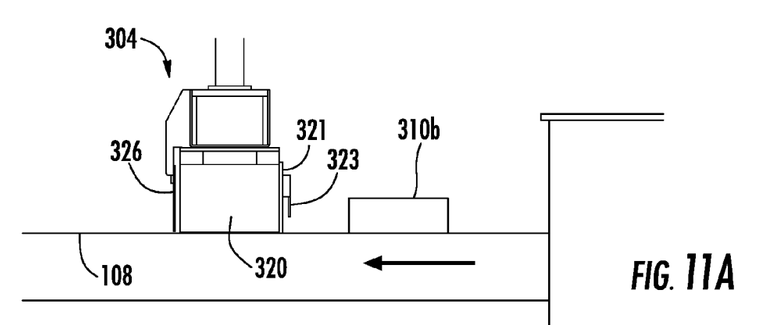
FIGS. 11A-11D are schematic representations of possible steps used in arranging two articles using the systems of FIGS. 1-10.
Figure 11B:
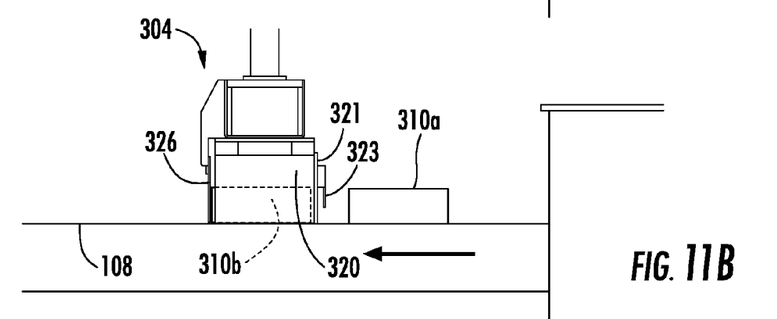
Figure 11C:
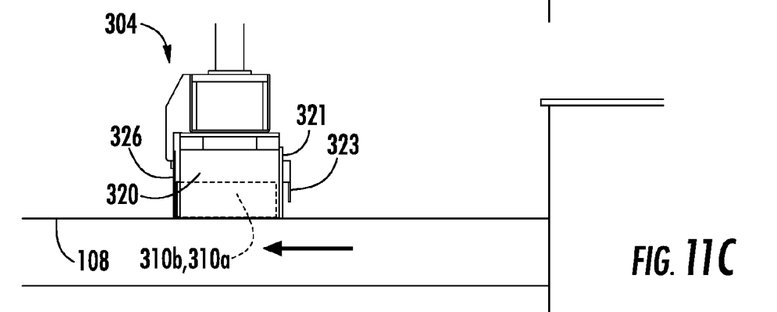
Figure 11D:
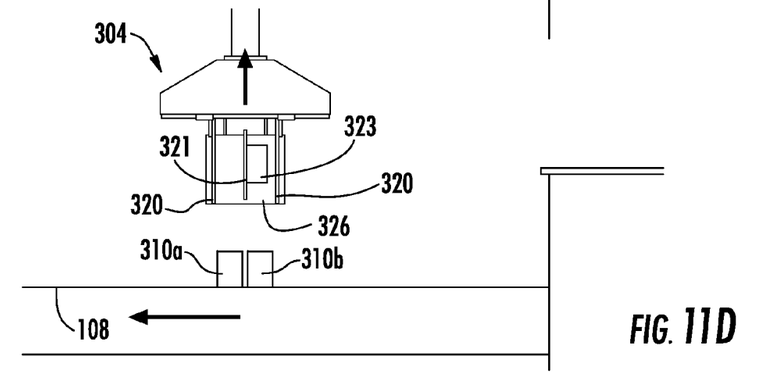

FIGS. 11A-11D show an example of grouping articles 310a and 310b using end effector 304. As shown, stop portion 326 briefly slows article 310b (FIG. 11B). End effector 304 moves at least partially laterally, with holding plate 323 ensuring that article 310b remains within end effector 304. Article 310a then moves into end effector 304 until it also contacts stop portion 326. At this point articles 310a and 310b are located between lateral side portions 320 with divider 321 between them (FIG. 11C). Side portions 320 may be moved inwardly toward articles 310a and 310b, either individually after an article is received or together after both articles are received, to secure the articles within end effector 304. In FIG. 11C, from the viewing angle to the side of conveyor 108, articles 310a and 310b overlap. In FIG. 11D, head 304 has been rotated 90 degrees and articles 310a and 310b have been accordingly rotated 90 degrees so they are both visible.

As noted, if articles 310a and 310b are being fed to conveyor 108 in a straight line, end effector 304 will move laterally after contacting article 310b so that article 310a can fit within end effector 304 on the opposite side of divider 321. If articles are being fed in a staggered line, such lateral movement could be unnecessary.

FIG. 12 shows schematically the manipulation of articles so as to form side-by-side groupings. As illustrated, stop portion 326 of end effector 304 first contacts a downstream article (A7) to slow it while an upstream article (A6) slides into position within end effector 304. Articles A8 and A9 are laterally arranged in a group (but not rotated as in FIG. 11D), as are articles A10 and A11.

The placement of the articles in any of the systems above is determined by a desired pallet forming or laning algorithm used downstream. Accordingly, any suitable arrangement of articles can be achieved, limited only by the downstream packaging capabilities or desires of the facility. Also, the various end effectors disclosed can be used to arrange one, two, three or more articles at a time, as desired for a given algorithm.

It should be understood that characteristics of any of the systems noted above can be mixed or matched for any particular desired application. Thus use of the object manipulation devices such as robot arm assemblies or gantry devices, end effectors, methods and systems herein are not limited to any of the particular arrangements disclosed herein. Any number of robot arm assemblies could be employed. For example, FANUC Robotics M420iA or M710iC/50H Robot Arm Assemblies could be used, along with Fanuc Robotics R30iA or R30iB Robot Controllers. Similarly, various types of commercially available gantry devices could be employed. Programmable Logic Controllers for the systems could be provided by Rockwell Automation/Allen-Bradley, such as CompactLogix or ControlLogix Controllers. Rockwell Automation RSView 5000 software or others could also be employed in such system, if desired.

The present invention therefore also includes a method of using an object manipulation device such as a robot arm or gantry device to arrange two articles within a stream of articles moving spaced apart and in a line in a conveying direction on a conveyor 108. In its broad sense the method may include contacting the more downstream 110b, 110c, 310b of the two articles, slowing the more downstream of the two articles, and maintaining contact with the more downstream article while contacting the more upstream article 110a, 110b, 110c, 310a without substantially slowing the more upstream article. The contacting step can as discussed include using an end effector 104, 204, 304 having two lateral side portions 120, 220, 320 and a downstream stop portion 126, 226a, 226b, 326. The downstream stop portion may contact a downstream side of the more downstream article. The method can involve arranging the articles along the conveying direction or across the conveying direction within the end effector 104, 204, 304. The method can include change out of the end effector 104, 204, 304 for another end effector so as to allow for different articles to be handled. The method can also include changing out elements of the end effector 104, 204, 304 such as downstream stop portion assemblies (with or without dividing plates 321) to allow for different articles to be handled without removing the entire head assembly from end 118 of the robot arm assembly or a gantry device 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A system for arranging articles within a stream of articles moving spaced apart and in a line in a conveying direction on a conveyor, the system comprising:
   an object manipulation device including a robot arm assembly with a first, proximal end mounted adjacent to the stream and a second, distal end having an end effector including a head, two lateral side portions attached to the head, and a downstream stop portion, the robot arm assembly movable and configured to form a group of two of the articles in the line together by contacting and slowing the more downstream of the two articles via the downstream stop portion and then contacting the more upstream of the two articles without substantially slowing the more upstream article so that the group moves with constant motion at the speed of the more upstream of the two articles and synchronized with the conveyor, at least one of the lateral side portions being movable toward the other-lateral side portion for gripping the two articles.

2. The system of claim 1, wherein the downstream stop portion is attached to the head of the end effector.

3. The system of claim 1, wherein the downstream stop portion is attached to one of the lateral side portions.

4. The system of claim 3, further including a second downstream stop portion attached to the other of the lateral side portions.

5. The system of claim 1, further including a divider attached to the head between the lateral side portions.

6. The system of claim 5, wherein the divider is attached to the head via the downstream stop portion.

7. The system of claim 1, wherein the object manipulation device is drivable so as to move the group laterally relative to the conveying direction to arrange the group for forming a desired orientation downstream.

8. The system of claim 1, wherein the object manipulation device is drivable so as to move the group along the conveying direction to arrange the group for forming a desired orientation downstream.

9. The system of claim 1, wherein the object manipulation device is drivable so as to rotate the group relative to the conveying direction to arrange the group for forming a desired orientation downstream.

10. A method of using an object manipulation device including a robot arm assembly with a first, proximal end mounted adjacent the stream and a second, distal end having an end effector to arrange two articles within a stream of articles moving spaced apart and in a line in a conveying direction on a conveyor, the end effector including a head, two lateral side portions attached to the head, and a downstream stop portion, the method comprising:
    contacting the more downstream of the two articles via the downstream stop portion;
    slowing the more downstream of the two articles;
    maintaining contact with the more downstream of the two articles while contacting the more upstream of the two articles without substantially slowing the more upstream article to form a group of the two articles so that the group moves with constant motion at the speed of the more upstream of the two articles and synchronized with the conveyor; and
    moving at least one lateral side portion toward the other lateral side portion for gripping the two articles.

11. The method of claim 10, further including driving the object manipulation device so as to move the group laterally relative to the conveying direction to arrange the group for forming a desired orientation downstream.

12. The method of claim 10, further including driving the object manipulation device so as to move the group along the conveying direction to arrange the group for forming a desired orientation downstream.

13. The method of claim 10, further including driving the object manipulation device so as to rotate the group relative to the conveying direction to arrange the group for forming a desired orientation downstream.

14. The method of claim 10, wherein the maintaining step includes driving the object manipulation device so that the more upstream of the two articles contacts the more downstream of the two articles along the conveying direction within the end effector.

15. A method of using an object manipulation device including a robot arm assembly with a first, proximal end mounted adjacent the stream and a second, distal end having an end effector to arrange two articles within a stream of articles moving spaced apart and in a line in a conveying direction on a conveyor, the method comprising:
    contacting the more downstream of the two articles via the end effector;
    slowing the more downstream of the two articles;
    maintaining contact with the more downstream of the two articles while contacting the more upstream of the two articles without substantially slowing the more upstream article to form a group of the two articles so that the group moves with constant motion at the speed of the more upstream of the two articles and synchronized with the conveyor; and
    driving the object manipulation device so that the more upstream of the two articles is located laterally to the more downstream of the two articles along the conveying direction within an end effector having a head, two lateral side portions attached to the head, and a divider attached to the head between the lateral side portions, the more upstream and more downstream articles ending up on opposite sides of the divider.

16. The method of claim 15, further including driving the object manipulation device so as to move the group laterally relative to the conveying direction to arrange the group for forming a desired orientation downstream.

17. The method of claim 15, further including driving the object manipulation device so as to move the group along the conveying direction to arrange the group for forming a desired orientation downstream.

18. The method of claim 15, further including driving the object manipulation device so as to rotate the group relative to the conveying direction to arrange the group for forming a desired orientation downstream.

* * * * *